United States Patent [19]

Saito et al.

[11] Patent Number: 4,712,203
[45] Date of Patent: Dec. 8, 1987

[54] METHOD AND APPARATUS FOR THERMO MAGNETIC RECORDING/ERASING INFORMATION WITH PRESELECTED MAGNETIC FIELD SWITCHING

[75] Inventors: Atsushi Saito, Ichikawa; Masahiro Ojima, Tokyo; Takeshi Maeda, Kokubunji; Tsuyoshi Kato, Hachioji, all of Japan

[73] Assignee: Hitachi, Ltd., Tokyo, Japan

[21] Appl. No.: 743,974

[22] Filed: Jun. 12, 1985

[30] Foreign Application Priority Data

Jun. 13, 1984 [JP] Japan ............................ 59-120000

[51] Int. Cl.⁴ .................. G11B 11/14; G11B 13/04; G11B 5/024
[52] U.S. Cl. .................................. 369/13; 369/100; 360/59; 360/114; 365/122
[58] Field of Search ............... 369/13, 100, 110; 360/59, 114; 365/122

[56] References Cited

U.S. PATENT DOCUMENTS

| | | | |
|---|---|---|---|
| 4,094,013 | 6/1978 | Hill et al. | 369/110 |
| 4,472,748 | 9/1984 | Kato et al. | 360/114 |
| 4,549,287 | 10/1985 | Hatano et al. | 369/13 |
| 4,586,092 | 4/1986 | Martens et al. | 360/114 |
| 4,610,009 | 9/1986 | Connell | 369/110 |

FOREIGN PATENT DOCUMENTS

| | | | |
|---|---|---|---|
| 0030132 | 2/1982 | Japan | 360/114 |
| 0013304 | 1/1985 | Japan | 360/114 |

Primary Examiner—Raymond F. Cardillo, Jr.
Assistant Examiner—Hoa T. Nguyen
Attorney, Agent, or Firm—Antonelli, Terry & Wands

[57] ABSTRACT

Method and apparatus for processing information on a recording member having a recording film capable of recording and erasing information in accordance with the change of a magnetizing direction, by utilizing a light induced thermo-magnetic effect, in which before the intensity of the laser light is switched at the high level eliminating the magnetization of the recording film in order to effect the recording and erasing operations by focusing the laser light on the recording film as a light spot, a magnetic field with the predetermined direction according to the recording and erasing operations is previously applied on the recording film, whereby the recording and erasing operations of the magnetized information can be effected with high speed and stably by applying the normal magnetic field in the direction according to the recording and erasing operations respectively.

8 Claims, 5 Drawing Figures

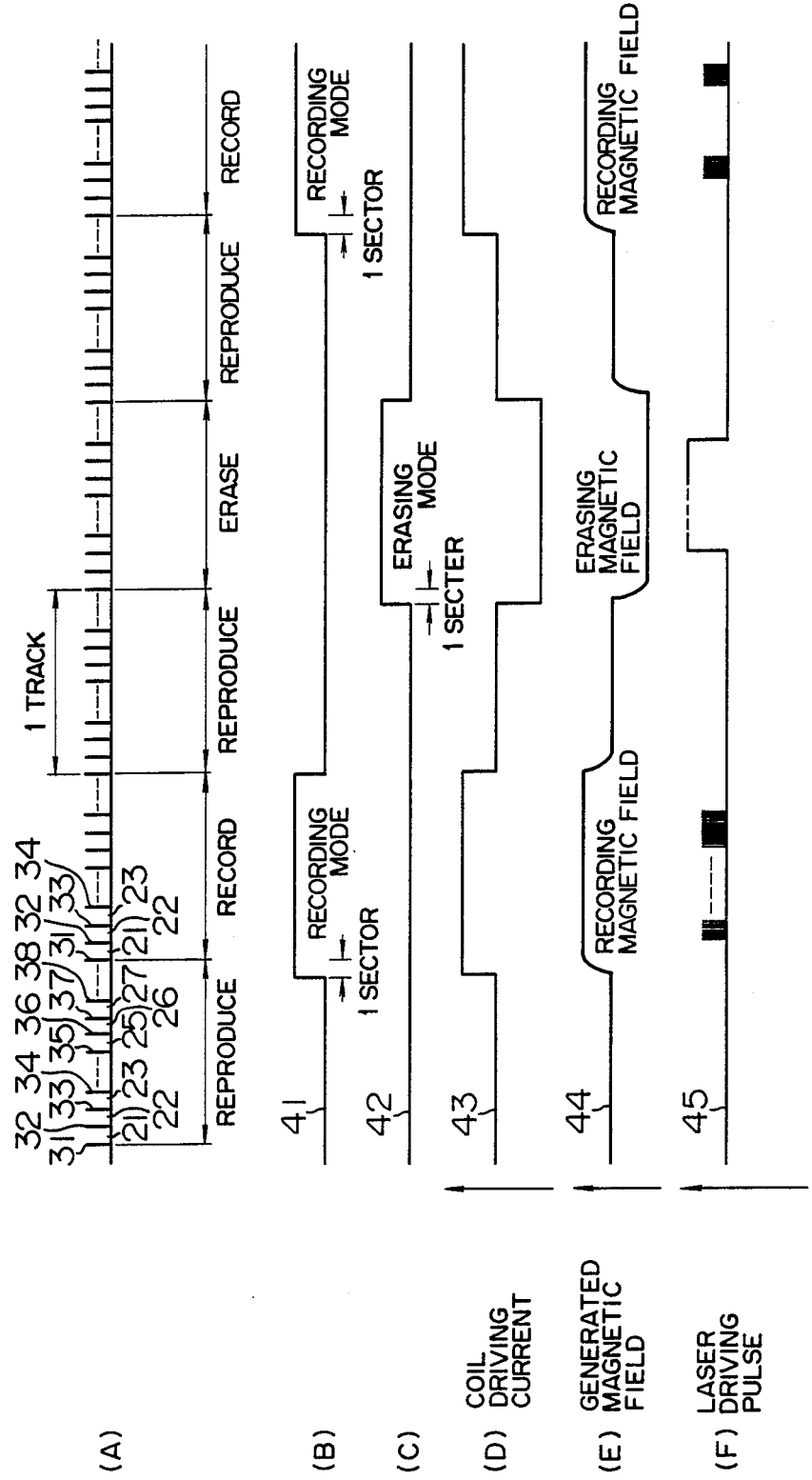

4,712,203

METHOD AND APPARATUS FOR THERMO MAGNETIC RECORDING/ERASING INFORMATION WITH PRESELECTED MAGNETIC FIELD SWITCHING

BACKGROUND OF THE INVENTION

The present invention relates to a magneto-optical information processing method and a magneto-optical information processing apparatus, in both of which information is recorded and erased by utilizing a light induced thermo-magnetic effect and is reproduced on the basis of the magneto-optic effect, and more particularly to the above method and apparatus capable of applying a stable magnetic field to a magnetic recording medium in a recording operation and an erasing operation.

A magneto-optical information storage apparatus is disclosed in, for example, an article entitled "Amorphous thin film disk for magneto-optical memory" by NHK Broadcasting Science Research Laboratories, SPIE, Vol. 329, page 208, Optical Disc Technology, 1982. An apparatus of this kind is made up of a recording/reproducing optical system and an electromagnetic coil, and the electromagnetic coil is disposed so that a recording medium is sandwiched between the electromagnetic coil and a focusing lens. Further, a magneto-optical information processing apparatus generally uses a perpendicular magnetic thin film as the information recording medium, and a recording operation is performed by reversing the direction of magnetization of the magnetic thin film in accordance with information. Further, a reproducing operation is performed by utilizing a phenomenon that the plane of polarization of light incident on the magnetic thin film is rotated depending upon the direction of magnetization of thereof, that is, the magneto-optic effect. In this apparatus, recorded information is erasable or rewritable. In more detail, a recording operation and an erasing operation are performed in such a manner that a portion of the magnetic thin film is heated by a laser beam which is focused on the portion, so that the magnetization at the portion is extinguished, and then an external magnetic field in a desired direction is applied to the portion by an electromagnetic coil, to establish fixed magnetization at the portion, that is, the recording and erasing operations are performed on the basis of a light induced thermo-magnetic effect. However, it is required to make the direction of magnetic field applied in the recording operation opposite to the direction of magnetic field applied in the erasing operation. Further, it is important to reverse the direction of applied magnetic field at high speed. Accordingly, in a magneto-optical information processing apparatus, it is very important how stably an external magnetic field is applied to a magneto-optical recording medium to enhance the processing speed and reliability of the apparatus.

SUMMARY OF THE INVENTION

It is an object of the present invention to provide a magneto-optical information processing method and a magneto-optical information processing apparatus, in both of which a stable, stationary magnetic field is applied to a recording medium in recording and erasing operations, to record and erase information stably and at high speed.

In order to attain the above object, according to the present invention, prior to irradiating that portion of a recording medium which is to be subjected to a recording or erasing operation, with a light pulse, an external magnetic field is applied to the recording medium so that the intensity of the external magnetic field at the portion reaches a stationary value when the portion is irradiated with the light pulse. In general, the risetime of a magnetic field generated by an electromagnetic coil is dependent upon the time constant of the coil. In order to generate a strong magnetic field, it is required not only to make large the inductance of the coil but also to make large a driving current flowing through the coil. However, it is very difficult to perform a high-speed switching operation for a large driving current by a driver circuit of the coil. Further, when a saturation switching circuit is used, it is impossible to form a stationary magnetic field in a period which is shorter than the time constant of the coil. The high-speed switching may be realized by placing the coil in close proximity to the recording medium and by making the coil small in size. In this case, however, the most important advantage of the magneto-optical information processing apparatus that information can be recorded, erased and reproduced by the non-contact method, will be lost.

According to the present invention, taking into consideration of the risetime of magnetic field, a current is forced to flow through the electromagnetic coil prior to irradiating the recording medium with the light pulse. Thus, the recording and erasing operation are performed after the magnetic field has reached a stationary state.

For example, let us consider a magneto-optical disk in which a sector is used as a processing unit, a host control unit can readily identify a sector which is to be subjected to a recording or erasing operation. According to the present invention, a reproducing operation for at least one track is performed between a recording operation and an erasing operation which are opposite in direction of applied magnetic field to each other, and a driving current having a desired direction is caused to flow through a coil when a sector that precedes a target sector (in which information is to be recorded or erased) by an amount corresponding to the time constant of the coil, is detected, and thus the direction of applied magnetic field can be changed before the target sector is irradiated with a light pulse.

BRIEF DESCRIPTION OF THE DRAWINGS

FIGS. 3(A)–(F) is a time chart for explaining an example of a sequential operation for recording, erasing and reproducing information, according to the present invention.

DESCRIPTION OF THE PREFERRED EMBODIMENT

The present invention will be explained below in detail, with reference to the drawings.

Figure 1:
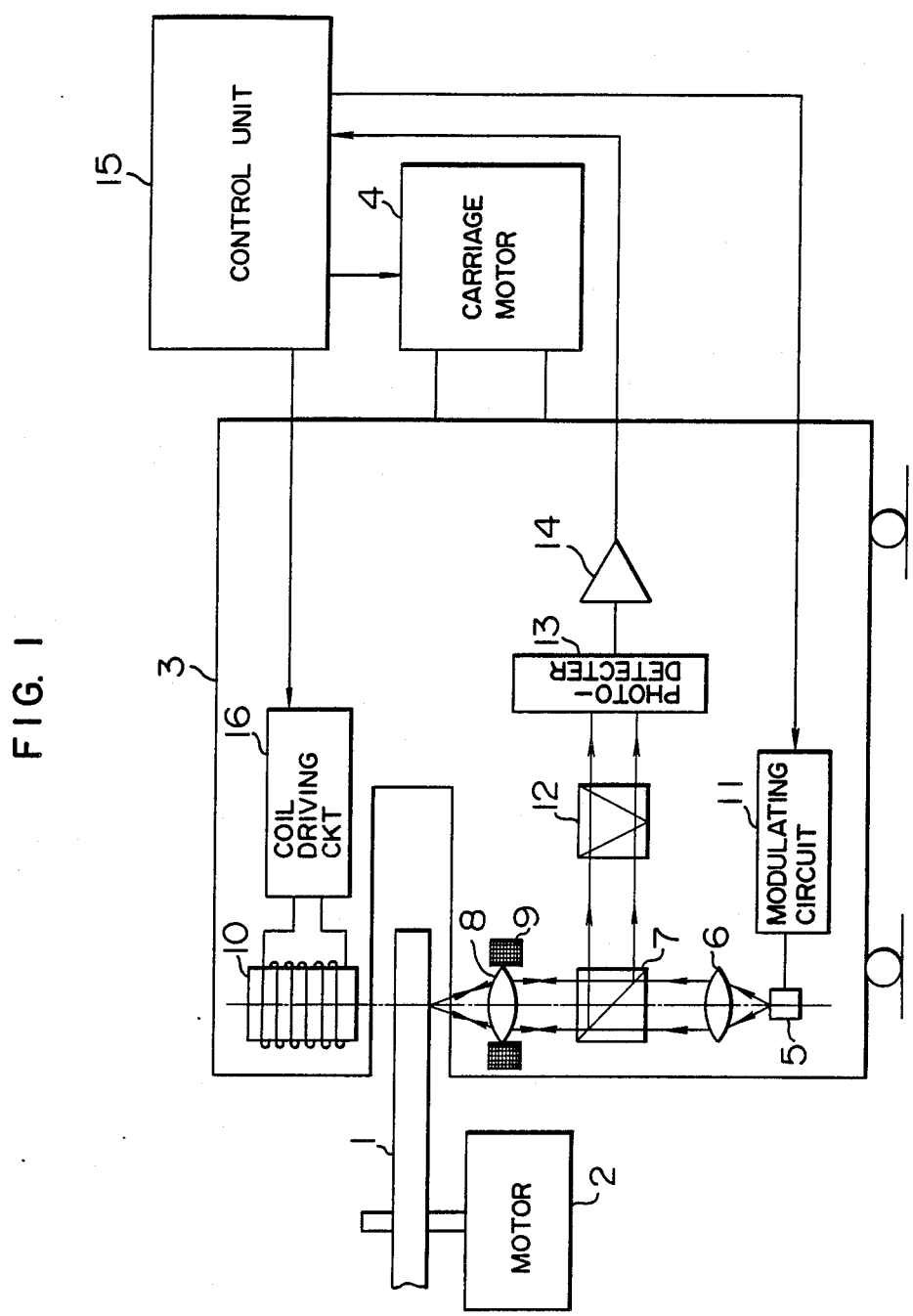
FIG. 1 is a diagram, partly schematic and partly in block, of an embodiment of a magneto-optical disk apparatus according to the present invention.

FIG. 1 is a diagram, partly schematic and partly in block, of an embodiment of a magneto-optical disk apparatus according to the present invention. Referring to FIG. 1, a disk-shaped, magneto-optical recording member (hereinafter referred to as "magneto-optical disk") 1 is rotated by an electric motor 2, and a magneto-optic head 3 for recording, reproducing and erasing information can be moved by a carriage motor (for example, a linear motor) 4 in a radial direction of the disk 1 so as to reach a desired track on the disk 1. The magneto-optical disk 1 has a substrate made of glass, plastic, or other material and a perpendicular magnetic film which is formed on the substrate and made of, for example, TbFe so as to have the magneto-optic effect. The magnetic film may be sandwiched between a pair of protective layers which are made of, for example, $SiO_2$. A laser beam emitted from a light source 5 such as a semiconductor laser is converted by a coupling lens 6 into a parallel beam, and then passes through a beam splitter 7 and an objective 8 to form a fine light spot on the disk 1. In a case where the laser beam emitted from the semiconductor laser has an elliptical cross section, a light beam transform optical system formed of, for example, a triangular prism is interposed between the lens 6 and the beam splitter 7 to transform the above laser beam into a laser beam having a circular cross section. In order that the objective 8 can follow the vertical motion of the disk 1, the objective 8 is mounted on a voice coil 9. In a case where information is recorded on the disk 1, the driving current of the semiconductor laser 5 is modulated by a modulation circuit in accordance with an information signal, and the magnetic film of the disk 1 is irradiated with a light pulse corresponding to information which is to be recorded. Thus, the magnetic film is locally heated, and the magnetization of the film is locally extinguished. A portion of the magnetic film where the magnetization is extinguished, is applied with a magnetic field whose direction is opposite to the direction of magnetization in the neighborhood of the portion, by an electromagnetic coil 10 which is disposed so that the disk 1 is interposed between the objective 8 and the coil 10. Thus, a region having reversed magnetization (namely, a magnetic domain) is formed at the light irradiated portion of the magnetic film. In a case where recorded information is erased, a constant current is caused to flow through the semiconductor laser 5, to irradiate the magnetic film with a laser beam having a predetermined intensity, thereby distinguishing the magnetization of the magnetic film. Then, a magnetic field which is opposite in direction to the magnetic field applied in the recording operation, is applied to the magnetic film by the electromagnetic coil 10, to magnetize a light irradiated portion in the same direction as the direction of magnetization in a surrounding non-recorded area.

The magnetization information recorded in the above-mentioned manner is reproduced by utilizing a magneto-optic effect such as the Kerr effect. The term "Kerr effect" indicates a phenomenon that the plane of polarization of light incident upon a magnetic film is rotated in opposite directions depending upon whether the magnetic film is magnetized upwardly or downwardly. Referring back to FIG. 1, light reflected back from the disk 1 passes through the objective 8, and is then separated from the incident light by the beam splitter 7. The reflected light thus separated is led to an analyzer 12. The analyzer 12 allows only a polarized light component to pass therethrough. Accordingly, the rotation of the plane of polarization corresponding to whether a recorded portion is present or not and based upon the Kerr effect is converted by the analyzer 12 into a change in light quantity. The change in light quantity is converted by a photo-detector 13 into an electric signal, which is amplified by an amplifier 14 to a desired level. A control unit 15 for controlling the whole of the embodiment, can control not only various parts such as the carriage motor 4, the modulation circuit 10, and the coil driving circuit 16 of the electromagnetic coil 10, but also various operations such as an information recording operation, an information reproducing operation, and an information erasing operation.

Now, exemplary numerical values with respect to the external magnetic field applied to the magnetic film will be described below. When information is recorded or erased, the external magnetic field has an intensity of about 200 Oe (oersted) at the magnetic film. Such a magnetic field can be formed by passing a current of about 50 mA through an electromagnetic coil having an inductance of 300 mH. The time constant of this coil is about 3 ms.

Figure 2:
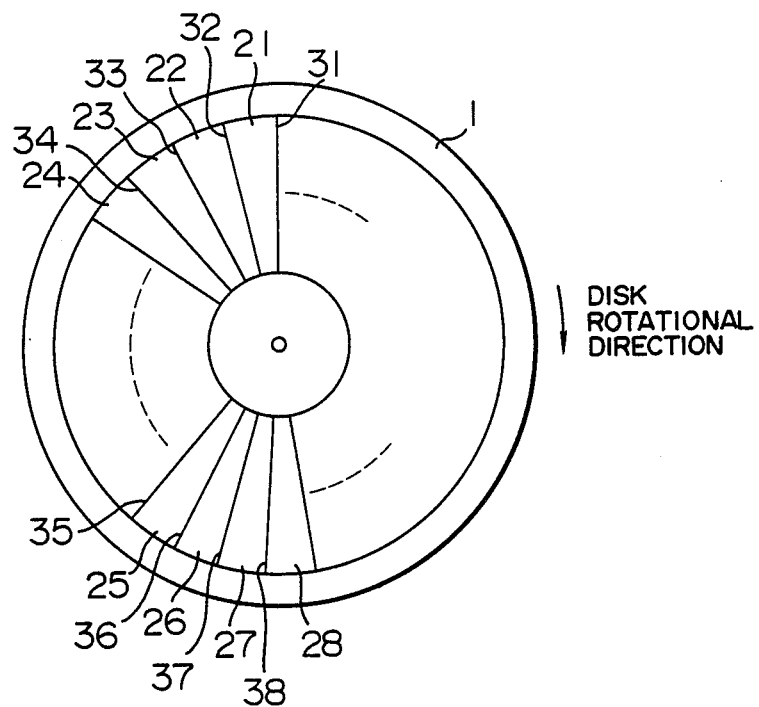
FIG. 2 is a schematic diagram showing an example of the recording format of the disk used in the embodiment of FIG. 1.

Next, explanation will be made of the magneto-optical disk used in the present invention. FIG. 2 shows an example of the format of the disk 1. Referring to FIG. 2, a spiral track or a plurality of concentric tracks are formed on the disk 1 along the rotational direction thereof. One track corresponding to the circumference of the disk 1 is divided into a plurality of recording regions 21 to 28. Each of these recording regions is called "sector", and is used as a unit for recording, reproducing and erasing information. Header portions 31 to 38 are provided at the tops of the sectors 21 to 28, respectively. Addresses for indentifying a sector such as a track number and a sector number, a sector mark indicating the starting point of the sector, and items necessary for recording information in and reproducing information from the sector such as a synchronizing signal, are previously written in the header portion in the form of an uneven pattern due to pit distribution (that is, an uneven pattern having a phase structure). Further, in order that the light spot can scan each track accurately, an optically detectable guide groove serving as an optical guide is previously provided on the disk 1 in the form of a spiral or concentric circles, if necessary. The pits at the header portion may be formed in a guide groove, or may be formed in a flat region between adjacent guide grooves. However, in the magneto-optical disk, from which information is reproduced by detecting only a little rotation of the plane of polarization of incident light due to the magneto-optic effect, it is preferred to previously record header information in the flat region between adjacent guide grooves, and to record magnetization information of the data portion of each sector also in the flat region between adjacent guide grooves, since an S/N ratio is improved.

Pits at the header portion can be detected from the output of the photo-detector 13. Alternatively, another beam splitter formed of a polarization prism is interposed between the beam splitter 7 and the analyzer 12, and the pits can be detected on the basis of the quantity of light passing through the another beam splitter. Further, by using the light having passed through the another beam splitter, signals for controlling the position of the light spot (that is, a focusing signal and a tracking signal) can be detected. For example, the light having passed through the another beam splitter is divided by a further beam splitter (formed of, for example, a half prism) into two parts, one of which is led to a circular photodetector composed of a pair of equal parts through a spherical lens, to detect the tracking signal from the difference between two outputs of the photodetector. While, the other light part passes through an astigmatic optical system which is made up of a spherical lens and a cylindrical lens. Part of the light having passed through the astigmatic optical system is intercepted by a knife edge, and the remaining part is led to a semicircular photo-detector composed of a pair of equal parts, to detect the focusing signal from the difference between two outputs of the photo-detector. In this case, the photo-detector for detecting the tracking signal also can be used for detcting the header signal, that is, the header signal can be detected from the sum of two outputs of this photo-detector. The header signal detecting system, the tracking signal detecting system and the focusing signal detecting system have no immediate connection with the present invention, and therefore these systems are omitted in the drawings for brevity's sake. The details of the above systems are described in, for example, U.S. patent application Ser. No. 685,123 entitled "Apparatus and Record Carrier for Magneto-optical Disc Memory and Master Disc Cutting Apparatus" filed Dec. 21, 1984 by Atsushi Saito, Masahiro Ojima and Masaru Ito, which is entitled to the benefit of the filing date of each of a Japanese patent application Appl. No. sho 58-242006 filed Dec. 23, 1983 and a Japanese patent application Appl. No. sho-133156 filed June 29, 1984.

Further, the pit information at the header portion and the magnetization information at the data portion can be detected in the following manner. The combination of a halfwave plate and a polarization beam splitter is used in place of the analyzer 12, and light passing through the polarization beam splitter and light reflected from the polarization beam splitter are detected by a pair of photo-detectors independently of each other. Then, the magnetization information is detected from the difference between the outputs of the photo-detectors, and the pit information is detected from the sum of the outputs of the photo-detectors.

Next, explanation will be made of an information recording operation, an information reproducing operation and an information erasing operation, each of which is performed for each sector.

FIG. 3 shows an example of a time chart for a case where one track corresponding to the circumference of the disk is used as the fundamental unit of each of the recording, reproducing and erasing operations, and information is recorded or erased at a given sector of a track. As shown in parts (E) and (F) of FIG. 3, the direction of applied magnetic field is changed at intervals of one or more tracks, and the irradiation of laser light is carried out for each sector. Further, as shown in part (A) of FIG. 3, a reproducing operation for one track is performed between a recording operation and an erasing operation. This reproducing operation is performed not only to ascertain the recording and erasure of information, but also to eliminate the adverse effects of the risetime and falltime of a magnetic field which is generated by the electromagnetic coil 10, on the recording and erasing operations. That is, the above adverse effect can be eliminated by performing a reproducing operation for one or more tracks between a recording operation and an erasing operation. Referring to part (B) of FIG. 3, a case where a recording mode at several tracks is instructed by the control unit 15, is indicated by a recording mode signal 41. As shown in part (B) of FIG. 3, a recording mode is started at a position that precedes a desired sector which is contained in a desired track and is to be subjected to the recording operation, by a distance corresponding to the risetime of the magnetic field generated by the electromagnetic coil 10, for example, by one sector. In a case where the risetime of the magnetic field is long and hence it is impossible to apply a stationary magnetic field to the desired sector by starting the recording mode at the position which precedes the desired sector by one sector, the recording mode is started at a position which precedes the desired sector by two or more sectors. When the recording mode is started, a coil driving current 43 shown in part (D) of FIG. 3 is generated by the coil driving circuit 16, and is applied to the electromagnetic coil 10, to generate a recording magnetic field 44 as shown in part (E) of FIG. 3. After the recording magnetic field has reached a stationary state, laser driving pulses 45 shown in part (F) of FIG. 3 are applied to the modulation circuit 11, to modulate the semiconductor laser 5 so that the magnetic recording film on the disk 1 is irradiated with relatively strong light pulses sufficient to extinguish the magnetization of the recording film. Thus, desired magnetization information can be stably recorded.

Magnetization information recorded on the disk 1 can be erased in a manner similar to the above-mentioned. Referring to part (C) of FIG. 3, it is indicated by an erasing mode signal 42 that an erasing mode at a track is instructed by the control unit 15. When the erasing mode is started, the coil driving circuit 16 passes the coil driving current 43 through the electromagnetic coil 10 in a direction opposite to the direction of coil driving current in the recording mode. Like the recording mode, the erasing mode is started at a position that precedes a desired sector which is contained in a desired track and is to be subjected to an erasing operation, by one or more sectors, that is, an erasing magnetic field is generated at the above position. After the erasing magnetic field has reached a stationary state, the laser driving pulses 45 are applied to the modulation circuit 11, to modulate the semiconductor laser 5 so that the magnetic recording film is irradiated with strong light pulses having an output level. Thus, recorded information is surely erased. In part (F) of FIG. 3, in order to perform the erasing operation for a plurality of sectors continuously, the laser driving pulses 45 are replaced by a D.C. current having a constant level.

For example, in a case where the disc 1 includes a single amorphous film made of a Tb-Fe compound, in order to stably perform a recording operation and an erasing operation, the light power at the film and the intensity of applied magnetic field are made equal to 5 mW and 100 Oe, respectively, in the recording operation, and are made equal to 5 mW and 300 Oe in the erasing operation.

When a reproducing operation is performed, the recording film is irradiated with the laser beam having a small, constant intensity insufficient to extinguish the magnetization of the recording film, and the rotational state of the plane of polarization of reflected light is detected, to be used for reproducing magnetization information. That is, in the reproducing mode, the intensity of the laser beam is too weak to extinguish the magnetization of the recording film, and therefore an external magnetic field used in a preceding mode may be applied to the recording film, as it is. In the present embodiment, however, no external magnetic field is applied to the recording film in the reproducing mode for the following reason. When the magneto-optical recording film is made of a material having a large coercive force, information recorded in the recording film is stable, but a light pulse of large power is required to record and erase information. On the other hand, when the recording film is made of a material having a small coercive force, a light pulse for recording and erasing information may be small in power, but information recorded in the recording film is readily affected by an external magnetic field. In the present embodiment, any external magnetic field is not applied to the recording film in the reproducing mode, to reduce light power required for recording and erasing information, without any danger of the recorded information being affected by an external magnetic field.

Figure 4:
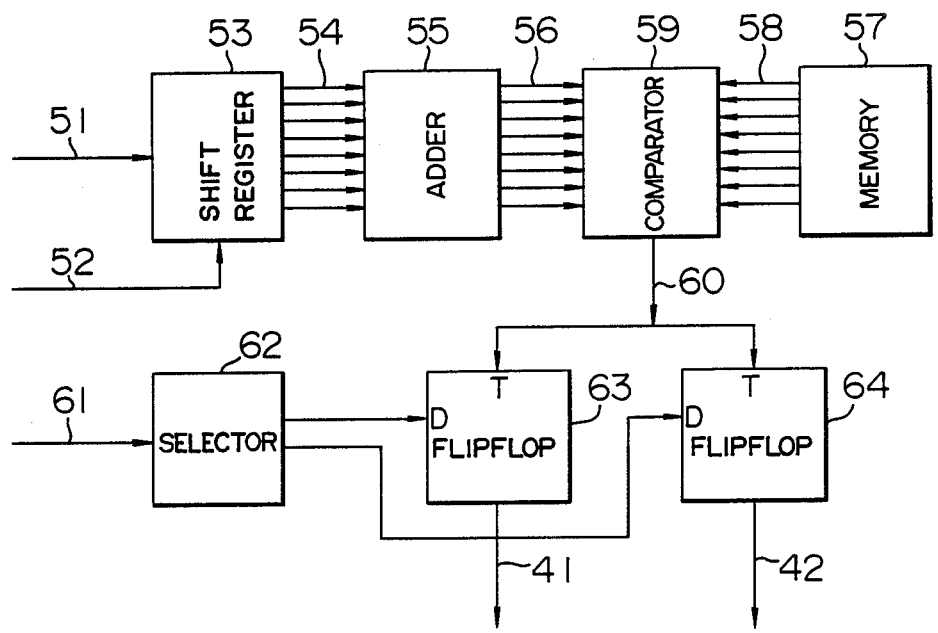
FIG. 4 is a block diagram showing an example of a logic circuit for controlling the generation of magnetic field.

Next, explanation will be made of the circuit configuration of a logical circuit for performing the sequential operation shown in FIG. 3 and the construction of the coil driving circuit 16 for generating a magnetic field. Various well-known circuits can be used as the semiconductor laser modulation circuit 11, without necessitating any special modification or additional parts, and therefore explanation of the modulation circuit 11 will be omitted. FIG. 4 shows an example of a logical circuit included in the control unit 15 for performing the sequential operation of FIG. 3. Referring to FIG. 4, the logical circuit receives serial data 51 indicative of the number of the present sector, a signal for marking off the serial data 51, that is, a latch signal 52, and a mode signal 61 for specifying a mode (namely, one of recording, erasing and reproducing modes) at a target sector. The serial data 51 indicative of a sector number is previously written in each of the header portions 31 to 38 in the form of a train of pits. The latch signal 52 is a signal for converting the serial data 51 indicative of the sector number into parallel data. A time when the above conversion is performed, is determined by the number of clock pulses applied after a sector mark which indicates the starting position of each sector, was detected. The data 51 and signal 52 are obtained from header information which is reproduced by the head 3. The mode signal 61 is issued by the control unit 15, and specifies one of the recording, reproducing and erasing modes. Accordingly, when the mode signal 61 is expressed by a binary signal, two signal lines are required to form the mode signal 61.

The serial data 51 which is read out by the head 3 and indicates a sector number, is applied to a shift register 53, to be converted by the latch signal 52 into parallel data 54, which is added to a predetermined value (that is, a numeral value 1 in the present embodiment) at an adder 55. Data 56 from the adder 55 is compared by a comparator 59 with the number 58 of the target sector which is to be put in a desired mode. The number 58 of the target sector is read out of a memory 57. When the data 56 coincides with the number 58 of the target sector, a signal indicating coincidence (namely, a coincidence signal) 60 is delivered from the comparator 59. While, the mode signal 16 is previously applied to a selector 62, to put a flip-flop 63 in a waiting state, for the recording mode, and to put a flip-flop 64 in a waiting state, for the erasing mode. For the reproducing mode, both of the flip-flops 63 and 64 are reset. The selector 62 controls the operations of the flip-flops 63 and 64 depending upon which of the recording, erasing and reproducing operations is taken. For the recording mode, the data terminal (namely, D-terminal) of the flip-flop 63 is put to a high potential level. For the erasing mode, the data terminal of the flip-flop 64 is put to a high potential level. The coincidence signal 60 is applied to the trigger terminal (namley, T-terminal) of each flip-flop, and thus only a flip-flop whose D-terminal is put to the high potential level, is set. Further, for the reproducing mode, the flip-flops 63 and 64 are both reset. Incidentally, the waiting state of a flip-flop means that the D-terminal of the flip-flop is kept at the high potential level. Accordingly, for the recording mode, the flip-flop 63 put in the waiting state is set by the coincidence signal 60, and thus the recording mode signal 41 from the flip-flop 63 takes a high level. The recording mode is reset when the mode signal 61 indicating the reproducing mode is issued from the control unit 15. For the erasing mode, the flip-flop 64 put in the waiting state is set by the coincidence signal 60, and thus the erasing mode signal 42 from the flip-flop 64 takes a high level.

In order to perform recording and erasing operations, it is required to apply a magnetic field to the recording film and to irradiate the recording film with a relatively strong light pulse. The risetime of the light pulse is in the order of one nanosecond, and is negligibly small as compared with the risetime of the magnetic field. Accordingly, the light pulse is given to a sector which is to be subjected to a recording or erasing operation, without paying special regard to time delay, in such a manner that the intensity of the light pulse is varied in accordance with header information of the sector.

A main feature of the logical circuit shown in FIG. 4 resides in that the number of the sector which is located behind the present sector (now receiving a light spot) by one sector, is compared with the number of the target sector, to detect a time when the light spot is placed on a sector which precedes the target sector by one sector. Although the number of the sector which is located behind the present sector by one sector, is compared with the number of the target sector in the logical circuit of FIG. 4, the number of the sector which preceds the target sector by one sector, may be determined by using a subtracter, to be compared with the number of the present target. Further, the data 56 may be obtained not by the adder 56 but by a software for operating the control unit 15.

Next, explanation will be made of the coil driving circuit 15 for generating the recording magnetic field and erasing magnetic field in response to the recording mode signal 41 and erasing mode signal 42, respectively.

Figure 5:
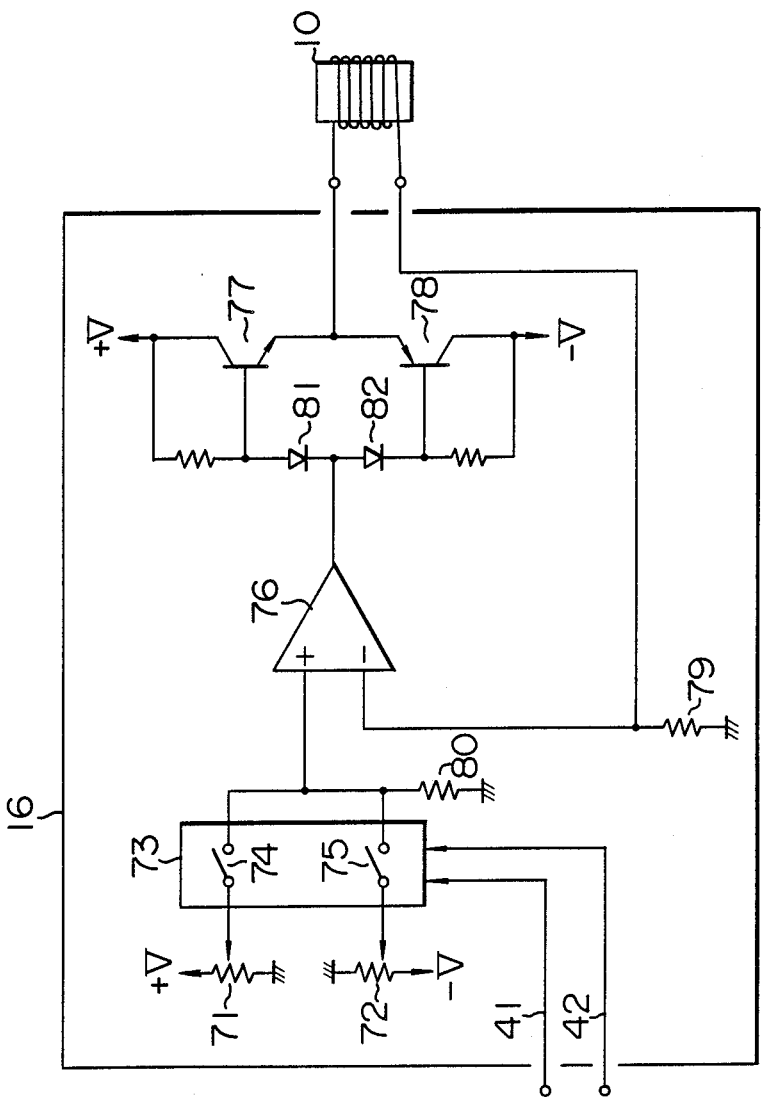
FIG. 5 is a circuit diagram showing an example of a coil driving circuit for a magnetic field generating coil.

FIG. 5 shows an example of the coil driving circuit 16. Referring to FIG. 5, a positive potential or variable resistance and a negative potential are set by potentiometers 71 and 72, respectively, and switches 74 and 75 included in an analog switch 73 are closed by the recording mode signal 41 and erasing mode signal 42, respectively. Now, let us consider a case where the switch 74 is closed by the recording mode signal 41. The positive potential set by the potentiometer 71 is applied to an operational amplifier 76, and thus a transistor 77 is turned on. Then, a current having a value which is obtained by dividing the positive potential from the potentiometer 71 by the resistance of a resistor 79, flows through the electromagnetic coil 10. While, in a case where the switch 75 is closed by the erasing mode signal 42, a transistor 78 is turned on, and thus a current having a value which is obtained by dividing the negative potential from the potentiometer 72 by the resistance of the resistor 79, flows through the electromagnetic coil 10 in a direction opposite to the direction of the current which flows through the coil 10 in the recording mode.

When both of the recording mode signal 41 and erasing mode signal 42 take a low level, the switches 74 and 75 are both kept open. Accordingly, the positive input terminal of the operational amplifier 76 is grounded through a resistor 80 of high resistance, that is, is applied with zero volt. Thus, no current flows through the electromagnetic coil 10. This state corresponds to the reproducing mode. Diodes 81 and 82 neutralize the base-emitter voltages of the trainsistor 77 and 78, respectively, and hence remove the cross-over distortion which is generated when each of the transistors 77 and 78 performs a switching action.

As has been explained in the foregoing, according to the present invention, when information is recorded or erased, a stationary magnetic field can be applied to a magnetic recording film in a direction corresponding to a recording operation or erasing operation, without paying special regard to conventional magnetic field generating means, that is, an electromagnetic coil for generating an external magnetic field and a coil driving circuit, and thus information can be recorded or erased stably and at high speed.

What is claimed is:

1. A method of processing information for a recording member having a recording film capable of recording and erasing information by changing the direction of magnetization of the recording film, in which recording and erasing operations are effected on the basis of a light induced thermo-magnetic effect, and in which reproducing operation is effected on the basis of a magneto-optic effect, comprising the steps of:
   providing said recording member in the form of a disk having a plurality of tracks each corresponding to the circumference of said recording member formed on said recording member, each of said tracks being divided into a plurality of sectors, and each sector having a header portion for storing a header signal which includes a sector number for identifying the sector, and a data portion following said header portion for recording magnetization information;
   focusing a laser beam on said recording film so that a light spot is formed on said recording film;
   applying a magnetic field to said recording film;
   changing the direction of said magnetic field at least between said recording operation and said erasing operation so that a magnetic field having a desired direction corresponding to an operation which is to be performed for a desired sector is applied to said recording film, the change of the direction of said magnetic field being effected when said light spot is positioned on a sector which precedes said desired sector by a predetermined number of sectors; and
   changing the intensity of said laser beam into a first level capable of extinguishing the magnetization of said recording film so as to perform at least one of said recording and erasing operations when said light spot is positioned on said desired sector.

2. A method of processing information as claimed in claim 1, wherein said reproducing operation is performed at least for one rotational period of said recording member between said recording operation and said erasing operation, and the intensity of said laser beam is kept at a second level insufficient to extinguish the magnetization of said recording film, in said reproducing operation.

3. A method of processing information as claimed in claim 1, wherein the application of said magnetic field in accordance with a desired direction is effected by controlling magnetic means for applying said magnetic field on the basis of the header signal from said sector which precedes said desired sector by a predetermined numbers of sectors, and the change of the intensity of said laser beam is effected by controlling a means for modulating the intensity of said laser beam, on the basis of the header signal from said desired sector.

4. A method of processing information as claimed in claim 2, wherein the application of said magnetic field to said recording film is stopped in said reproducing operation by controlling magnetic means for applying said magnetic field on the basis of a mode signal indicating a reproducing operation, and the application of said magnetic field in accordance with a desired direction is started by controlling said magnetic means on the basis of the header signal from the sector which precedes said desired sector by a predetermined number of sectors.

5. An information processing apparatus in which recording and erasing operations are effected on the basis of a light induced thermo-magnetic effect, and in which a reproducing operation is effected on the basis of a magneto-optic effect, the apparatus comprising:
   a recording member having a recording film capable of recording and erasing information in accordance with the change of a magnetized direction, said recording member having a plurality of tracks each of which has a plurality of sectors, each sector having a header portion recorded with a header signal including at least a sector number for discriminating the corresponding sector, and a data portion located sequentially to said header portion for recording magnetization information;
   a laser light source;
   optical means for focusing a laser beam from said laser light source on said recording film as a light spot;
   magnetic means for applying a magnetic field on said recording film;
   detecting means for detecting said header signal and magnetization information by the laser light reflected from said recording film in the reproducing operation;
   driving means for switching a direction of said magnetic field produced from said magnetic means at least between the recording operation and the erasing operation;
   first means coupled to said detecting means for detecting in response to said detected header signal from said detecting means when said light spot is positioned on a sector located in a position preceding a desired sector; and
   second means coupled to said first means for generating a signal for controlling said driving means for applying a magnetic field having a predetermined direction according to the operation to be effected with respect to said desired sector.

6. An information processing apparatus as claimed in claim 5, wherein there is provided laser light modulating means for switching an intensity of said laser light between a first level in which the magnetization of said recording film is eliminated and a second level in which the magnetization of said recording film is eliminated and a second level in which the magnetization of said recording film is not eliminated, whereby the reproducing operation is performed by laser light of said second level.

7. An information processing apparatus as claimed in claim 5, wherein said first means comprising first memory means for memorizing the sector address included in the header signal detected by said detecting means, second memorizing means for memorizing the sector address with respect to said desired sector, and comparing means connected to said first and second memorizing means for comparing both of memorized contents of said first and second memorizing means after a predetermined operation is effected to the memorized contents of either of said first and second memorizing means.

8. An information processing apparatus as claimed in claim 5, wherein said second means is composed of a first and a second circuits either of which is set in an operable condition in accordance with the recording operation or the erasing operation to be effected to said desired sector, for generating said control signal by the output of said first means.

* * * * *